Feb. 7, 1950　　　　　　L. HORNBOSTEL　　　　　　2,496,471
HIGH-PRESSURE FLUID SEALING ASSEMBLY
Filed March 14, 1947　　　　　　　　　　　　3 Sheets-Sheet 1
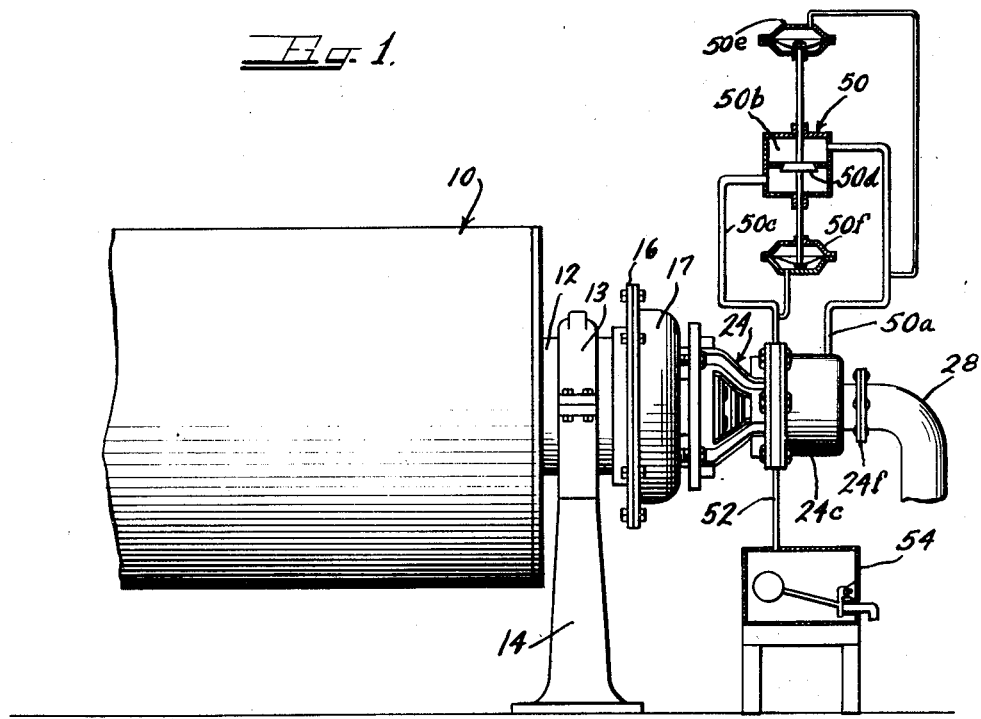
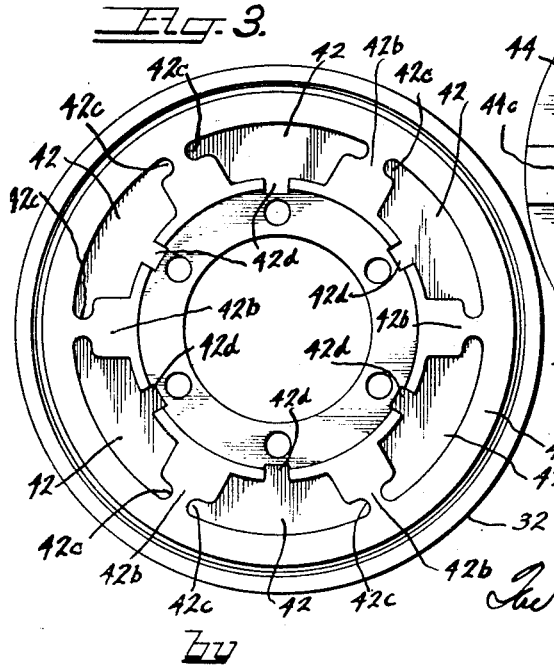
Inventor
LLOYD HORNBOSTEL

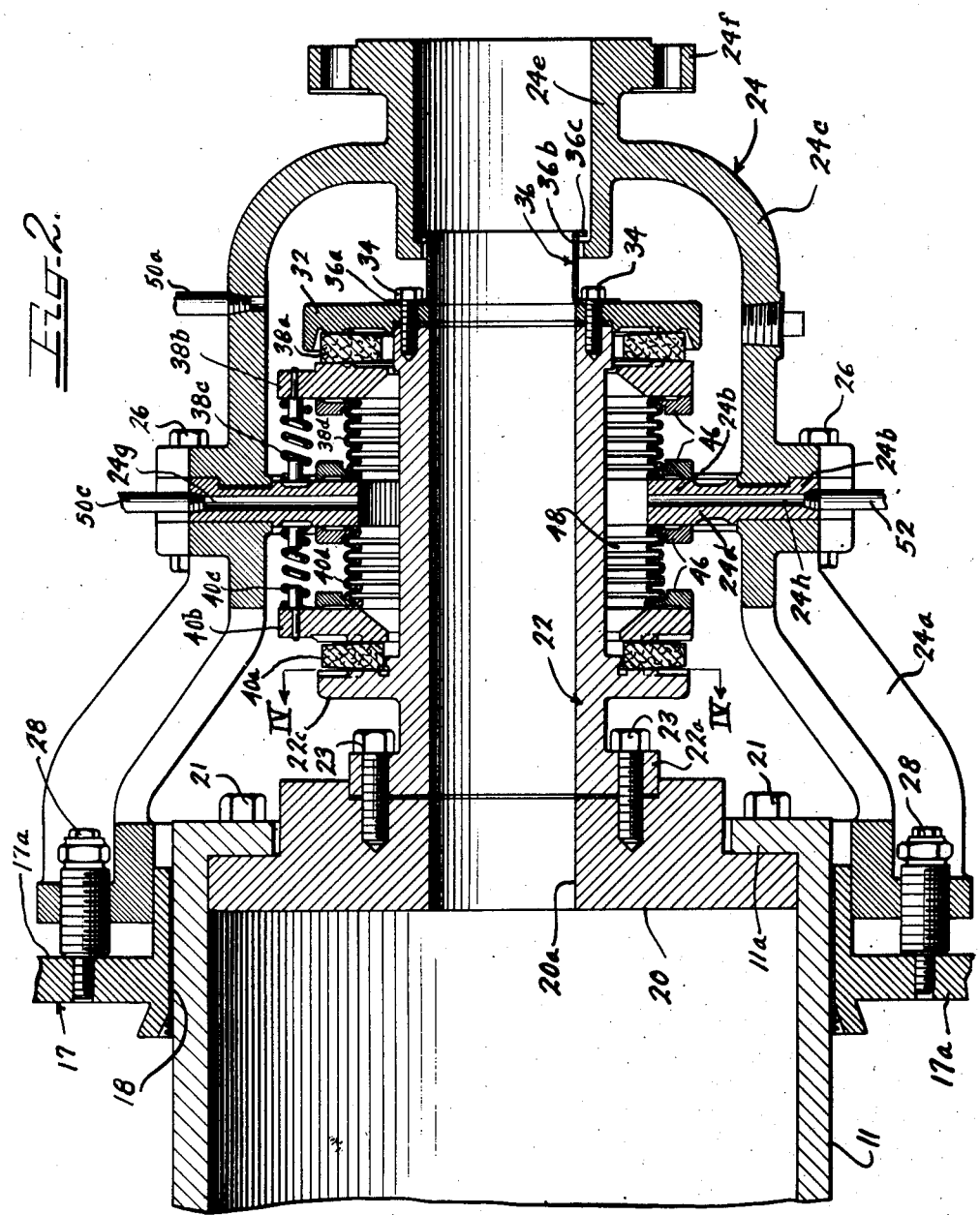

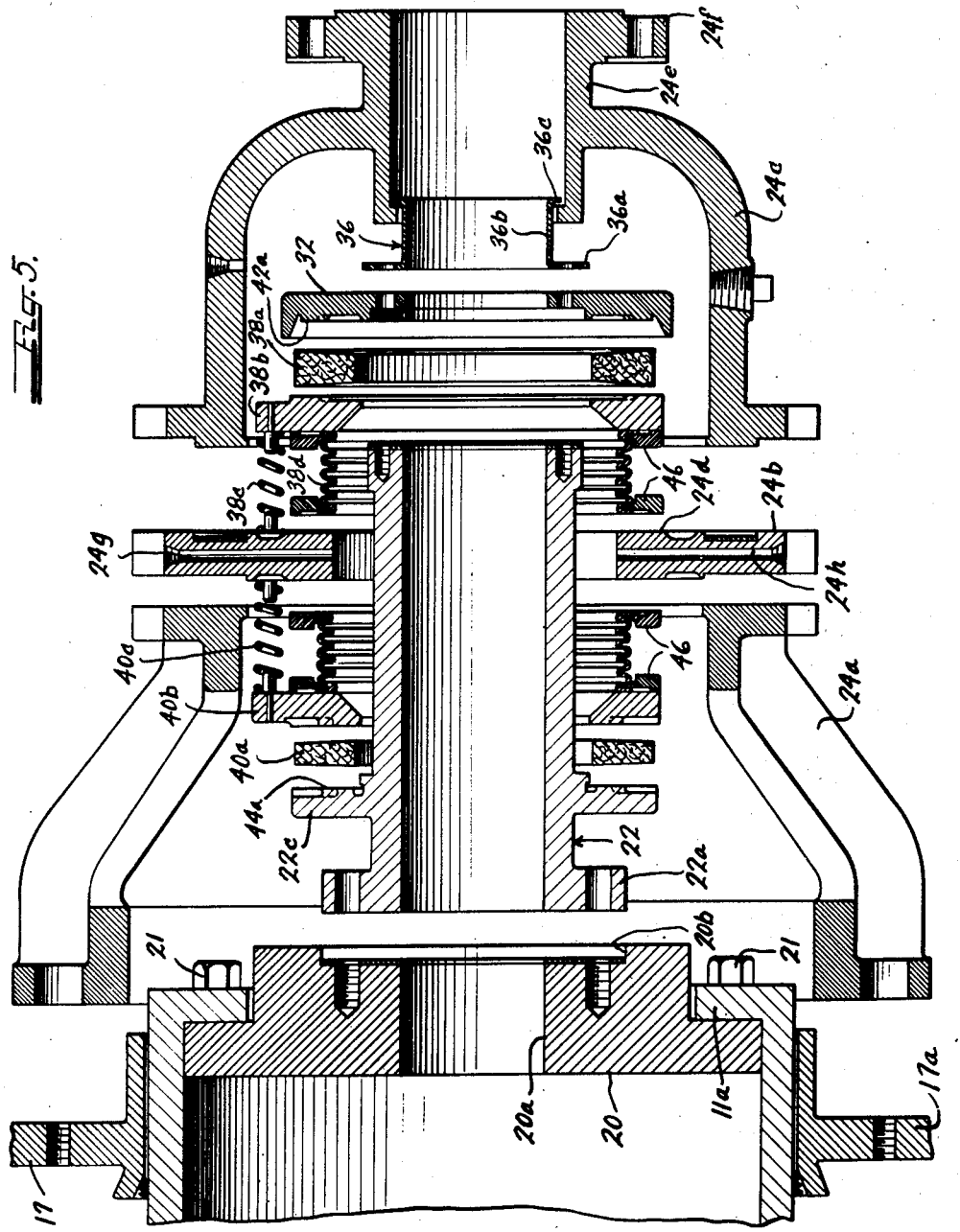

Patented Feb. 7, 1950

2,496,471

UNITED STATES PATENT OFFICE 2,496,471

HIGH-PRESSURE FLUID SEALING ASSEMBLY

Lloyd Hornbostel, Beloit, Wis., assignor to Beloit Iron Works, Beloit, Wis., a corporation of Wisconsin Application March 14, 1947, Serial No. 734,745

14 Claims. (Cl. 285—10)

This invention relates to a fluid sealing assembly for effecting a fluidtight seal between a rotating shaft-like member and a stationary casing member wherein one of such members is exposed to a high pressure fluid. This invention finds particular application as a steam journal for use in connection with the rotatable drier drum of a paper making machine.

While not limited thereto, the application of this invention to the drier drum of a paper making machine constitutes a good illustration of the unique and desirable features of a fluid sealing assembly embodying this invention. The drier drum of a paper making machine is generally steam heated and rotates when operating. The steam for heating the drum is usually fed or charged thereinto by an inlet pipe extending through the hollow back or rear trunnion of the drum. It is generally most convenient to permit such supply pipe to rotate with the drum so that, in effect, the supply pipe constitutes an axial extension of the drum or the drum shaft. It is therefore necessary to provide a stationary housing or coupling for connecting the rotating pipe with a suitable source for supplying steam to the drum. To prevent leakage between the rotating pipe and the stationary coupling, seals must be provided but these seals should not interfere with free flow of steam into the pipe nor should they impart appreciable frictional resistance to the rotational movement of the drum due to rubbing between rotating and stationary parts of the seal.

Heretofore, seals of known construction were not satisfactory when it was desired to use relatively high steam pressures in the drum. With seals of known constructions, the redesign of such seal to withstand higher steam pressures necessarily involved a substantial increase in the frictional drag between the rotating and stationary parts of the seal which resulted in the rapid deterioration of the seal, necessitating the frequent shut down of the machine for replacement.

Another requirement for the steam journals of a drier drum of a paper making machine is that such journal be capable of rapid disassembly for inspection or for repair and replacement of the sealing devices.

In a shaft seal embodying the present invention, a plurality of individual seal elements are provided to form a single seal unit, and the fluid pressure drop across each of such plurality of seal elements is maintained at a predetermined fraction of the entire difference in pressure between the steam pressure in the drying drum and the ambient pressure. Such an arrangement permits satisfactory sealing conditions to be obtained without an undesirable increase in frictional forces between the rotating and stationary parts of the seal elements. Therefore higher fluid pressures may be more effectively sealed without reducing seal life, as compared with seal constructions heretofore known, or, at low fluid pressures, more efficient sealing action with reduced frictional losses is obtainable.

It will of course be recognized by those skilled in the art that any reduction in frictional losses produces a corresponding increase in life of the wearing parts of the seal and hence seal constructions embodying this invention will operate satisfactorily for a much longer period than similar devices heretofore known.

Furthermore, a seal construction embodying this invention may be rapidly disassembled and assembled for inspection or repair purposes.

Accordingly, it is an object of this invention to provide an improved fluid sealing assembly for rotating members exposed to high pressure fluids.

Another object of this invention is to simplify the construction of steam joints or fluid pressure packing joints for rotatable members exposed to high pressure fluids, such as the drying drums of paper making machines, and to improve the efficiency, operation and dependability of such joints.

A principal object of this invention is to provide a high pressure fluid seal assembly for a rotating shaft-like member wherein a plurality of individual seal elements are employed and the pressure difference across any one seal element is predetermined so as to never exceed a predetermined fraction of the total pressure difference between the maximum pressure of the fluid and the ambient pressure.

A particular object of this invention is to provide a high pressure fluid seal for a rotating shaft-like member wherein a chamber is provided adjacent the rotating member having one wall defined by a seal exposed to the maximum fluid pressure and another wall defined by a seal exposed to ambient pressure and wherein the pressure in such chamber is maintained at a value intermediate the maximum fluid pressure and the ambient fluid pressure so that the pressure drop across either of the individual seals may be reduced to a predetermined fraction of the difference between the maximum pressure and the ambient pressure.

A further object of this invention is to provide a steam journal for a rotating shaft-like member wherein a plurality of individual seal elements are employed to prevent leakage of steam to the surrounding atmosphere and wherein each of the individual seal elements includes a bellows which not only permits relative contraction and expansion movement of the rotating member with respect to the stationary portion of the journal but also exerts a compressive force upon the sealing faces of the seal element to increase the efficiency of the sealing action.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 1 is a schematic view, partly in section, of a fluid shaft seal embodying this invention, shown in assembly with a rotating drying drum of a paper making machine.

Figure 2 is an enlarged scale, sectional view taken on a diametral plane through the shaft sealing element of Figure 1.

Figure 3 is an elevational view of the sealing surface of one seal flange.

Figure 4 is a sectional view taken on the plane IV—IV of Fig. 2.

Figure 5 is an exploded view of the components shown assembled in Fig. 2.

As shown on the drawings:

The drawings should be understood as being more or less of a schematic character for the purpose of disclosing typical or preferred forms of the improvements that are contemplated herein, and in these drawings, like reference characters identify the same parts in the different views.

In Figure 1, the numeral 10 identifies a rotatable element which is subject to fluid pressure and for which a shaft seal is required, for example, the drier drum of a paper making machine, having a rear or back end trunnion 11 that is journaled in a bearing 12 mounted in an annular support 13 at the upper end of a pedestal 14. The outer portion of the bearing 12 is provided with an annular flange 16 to which a bearing end cap 17 is anchored by means of bolts or the like. As best shown in Figures 2 and 5, the bearing cap 17 is hollow and its outer end wall is centrally apertured as indicated at 18 to permit the end of hollow trunnion 11 to pass therethrough. It will be understood that the bore of hollow trunnion 11 is in fluid communication with the interior of the drum 10.

The projecting end of trunnion 11 is provided with an integral, inwardly projecting flange 11a and an annular coupling 20 having a central bore 20a is rigidly secured thereto by bolts 21. The outer face of coupling 20 is counterbored to provide a recess 20b which snugly receives the flanged end 22a of a pipe 22. Suitable bolts 23 rigidly secure pipe 22 to coupling 20 in axial alignment with trunnion 11. Pipe 22 therefore, in effect, constitutes an axial, shaft-like extension of the trunnion 11.

A seal support casing 24 is provided which may be conveniently formed by assembly of three separate pieces which are held in rigid assembly by bolts 26. Thus seal support 24 comprises a webbed primary support member 24a which is rigidly but axially adjustably secured by bolt members 28 to an integral flange 17a provided on bearing end caps 17. Immediately adjacent the webbed member 24a, an annular ring 24b is mounted which has a flange portion 24d projecting radially inwardly to define a central aperture surrounding but spaced from the central portion of the pipe 22. Lastly, support casing 24 comprises an end bell 24c which is of generally cup-shaped configuration and provided in its base portion with an apertured hub 24e having a pipe coupling flange 24f by which connection may be made through a conduit 28 (Figure 1) with a suitable source of high pressure fluid, in this particular case, a source of high pressure steam.

The outer end of pipe 22 terminates short of the inner face of the hub 24e of end casing 24c. An annular seal backing flange 32 is secured to such end portion of the pipe 22 by bolts 34 as is a generally tubular fluid guide member 36. Fluid guide member 36 has a radial flange 36a through which the bolts 34 pass and an axially extending tubular portion 36b projecting into the aperture of hub 24e of the end casing 24c. The outer end of the tubular portion 36b is deformed outwardly as indicated at 36c and the resulting arrangement is such that fluid entering the casing 24 is primarily directed into the bore of pipe 22, yet the interior of end casing 24c is in fluid communication therewith and subject to the same fluid pressure.

The pipe 22 is also provided with an outwardly projecting flange portion 22c which is disposed on the inner side of ring 24b approximately the same distance therefrom as the seal backing flange 32. A sealing unit 38 is assembled against backing flange 32 while a similar sealing unit 40 is assembled against pipe flange 22c. Each of the seal units 38 and 40 includes respectively annular sealing rings 38a and 40a, pressure plates 38b and 40b, seal springs 38c and 40c, and bellows elements 38d and 40d.

The outer radial face of pipe flange 22c defines a generally radial seating surface for the seal unit 40 while the inner radial surface of seal backing flange 32 provides a similar surface for the seal unit 38. As will be brought out in detail later, the seal unit 38 seals against radially inward flow of fluid while the seal unit 40 seals against the tendency of the fluid to flow radially outwardly. Accordingly, the seal ring 38a is of slightly tapered cross-sectional configuration, diminishing in thickness toward the center thereof, while the seal ring 40a is reversely tapered.

The radial sealing faces of backing flange 32 and pressure plate 38b of the seal unit 38 are recessed in the manner indicated in Figure 3 to improve the sealing action thereof and to reduce the friction between the stationary and movable parts of the seal unit. A plurality of spaced recesses 42 are provided in both of the opposed radial sealing faces of seal unit 38 and the non-recessed surface defines a continuous annular sealing surface 42a which however is of substantially less width than the total width of the cooperating seal ring 38a. While the recesses 42 are circumferentially spaced, they are provided with projecting portions 42c at each arcuate end between which is defined a radially extending sealing surface 42b of generally bottle neck configuration. The inner portions of sealing surfaces 42b are extended arcuately but do not join, being separated by small width channels 42d communicating with recesses 42. With a sealing face configuration as described, it has been found that the fluid sealing action is greatly improved, there being a negligible amount of leakage past the sealing surfaces. Furthermore any foreign objects that find their way between the sealing surfaces and which would ordinarily tend to scratch or mar such surfaces are trapped in the recesses 42. It has been further observed that the frictional losses in seal units embodying the described configuration are substantially reduced over that of constructions heretofore employed.

The radial sealing faces of the seal unit 40 are shaped in a similar manner to those of seal unit 38 but, of course, are of reversed configuration inasmuch as the direction of leakage fluid flow through the seal is reversed. As shown in Figure 4, the outer portions of the sealing faces of seal unit 40 are provided with circumferentially spaced recesses 44 which thereby define a continuous, annular sealing face 44a adjacent the inner portion of the sealing face. The recesses 44 are provided with arcuate extensions 44b to define sealing surfaces 44c of bottleneck configuration extending radially to the periphery of the sealing face. Similar advantages as recounted in connection with the sealing face construction of Figure 3 are obtained with the sealing face configuration of Figure 4.

The seal springs 38c and 40c operate respectively between the inwardly projecting flange portion 24d of ring 24b and the pressure plates 38b and 40b. The seal springs of course produce a snug engagement between the opposed radial sealing faces of each seal unit and the corresponding seal ring.

The bellows elements 38d and 40d respectively extend from internally projecting flange portion 24d to the non-sealing faces of the pressure plates 38b and 40b. The opposite ends of the bellows elements are respectively sealed to their supporting structures by clamping rings 46 and it is therefore apparent that the bellows elements cooperate with the external surface of pipe 22, flange portion 24d and each of the seal units 38 and 40 to define an enclosed compartment or chamber 48. The seal unit 38 separates compartment 48 from the high pressure fluid applied to the drier drum through the central aperture in the end casing 24c. The seal unit 40, however, separates the chamber 48 from the ambient pressure surrounding the mechanism, which of course, is generally atmospheric pressure. It is therefore apparent that if the chamber 48 is supplied with fluid at a pressure of a value intermediate atmospheric pressure and the high pressure within drier drum 10, then the pressure drop across each of the seal units 38 and 40 will be only a fraction of the total pressure difference between atmospheric pressure and the fluid pressure existing within drier drum 10. For example, if the chamber 48 is supplied with fluid pressure of a value equal to one-half of the difference between the high pressure in the drier drum 10 and atmospheric pressure, then the pressure drop across each of the seal units 38 and 40 will be exactly one-half of the total difference between the high pressure and the ambient pressure.

Any one of several well known forms of pressure control mechanism can be provided to maintain the pressure within chamber 48 at any selected value. While it is of course possible to provide fluid pressure from a separate source, I preferably derive the intermediate fluid pressure for chamber 48 from the high pressure source for the drier drum 10 through a pressure reducing regulator 50 (Fig. 1). In this manner, the pressure drop across each of the seal units 38 and 40 may be maintained at a predetermined fraction of the total pressure difference irrespective of variation in the high pressure.

Thus a pipe 50a may be tapped into the wall of end casing 24c to supply high pressure fluid to one side of the regulating chamber 50b of the pressure regulating valve mechanism 50. A pipe 50c connects the other side of regulating chamber 50b to the interior of chamber 48 through a suitable radial passage 24g provided in ring 24b. The transfer of fluid through the regulating chamber 50b is controlled by a valve 50d which is in turn controlled by a pair of diaphragms 50e and 50f respectively connected to the high and low pressure conduits 50a and 50c of the pressure regulating mechanism 50.

Since condensate will tend to collect within chamber 48, I preferably employ a condensate drain comprising a radial passage 24h in ring 24b which communicates through a pipe 52 with a conventional steam trap drain 54.

It is therefore apparent that the effective fluid pressure in chamber 48 may be readily selected by adjustment of pressure regulating mechanism 50 at any value intermediate the maximum pressure existing within the drier drum and the atmospheric pressure. It is further apparent that a higher pressure exists outside seal unit 38 than on the inside, while the pressure conditions are exactly reversed in seal unit 40, there being a higher pressure on the inside thereof than on the outside. This condition explains the necessity for the reverse tapering of the seal rings 38a and 40a respectively.

In addition to forming a wall of the intermediate pressure chamber 48, the bellows elements 38d and 40d, respectively, perform another important function in that they permit the sealing action of seal units 38 and 40 to be efficiently maintained irrespective of contraction and expansion movements of the pipe 22 or the trunnion 11 with respect to the stationary casing 24. Obviously, when steam is initially supplied to the drier drum 10, there will be an appreciable axial elongation of the drum 10 and trunnion 11 resulting in an axial movement of the pipe 22 with respect to the stationary casing 24. The bellows 38d and 40d expand or contract as the case may be to freely accommodate such relative movements without adversely affecting the engagement of the seal rings 38a and 40a with their sealing surfaces, or the pressure conditions within intermediate pressure chamber 48. Lastly, the bellows element 40d assists in maintaining a compressive force on the seal ring 40a inasmuch as the pressure difference between the inside and outside walls of bellows unit 40d is in the direction to tend to cause the bellows unit to expand and therefore exert axial pressure against the sealing faces of seal unit 40.

While in the particular example described, only one intermediate pressure chamber 48 was utilized, it will be apparent to those skilled in the art that even greater fractional reduction of the effective fluid pressures across each of the individual seal units may be obtained by providing additional intermediate pressure chambers and cooperating seal units so arranged that leakage fluid through the seals successively traverses such chambers. For example, if one additional intermediate pressure chamber were provided in a series connected arrangement with the intermediate pressure chamber 48, then the pressure across each of the individual seal elements corresponding to the seal elements 38 and 40 could be reduced to one-third of the total pressure difference between the high pressure within the drier drum and atmospheric pressure. Therefore extremely high fluid pressures can be safely and efficiently accommodated by shaft sealing assemblies embodying this invention without increasing the size of the individual seal units or adversely affecting the normal life of such seal units.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A high pressure fluid sealing assembly for a rotating, shaft-like member having a portion thereof exposed to high pressure fluid comprising stationary means defining a first chamber surrounding a portion of said shaft-like member, and including a pair of axially spaced seals engageable with said shaft-like member in sealing relationship, means defining a second chamber surrounding a portion of the walls of said first chamber and including one of said seals, means connecting said second chamber in fluid communication with said high pressure fluid, and means for supplying said first chamber with fluid at a pressure intermediate said high pressure and the ambient pressure.

2. A sealing assembly for a movable member exposed to high pressure fluid comprising stationary means defining a chamber, sealing means operatively disposed between said stationary means and said movable member, whereby fluid leaking past said sealing means enters said chamber, means for maintaining a fluid pressure in said chamber of a value intermediate said high pressure and the ambient pressure exteriorly of said chamber, and means responsive to said intermediate pressure for applying a compressive force on said sealing means substantially perpendicular to the sealing faces thereof.

3. A sealing assembly for a movable member exposed to high pressure fluid comprising stationary means defining a chamber, sealing means operatively disposed between said stationary means and said movable member whereby fluid leaking past said sealing means enters said chamber, means for maintaining a fluid pressure in said chamber of a value intermediate said high pressure and the ambient pressure exteriorly of said chamber, said chamber defining means including a bellows element to permit expansion and contraction movement of said movable member without adversely affecting the operation of said sealing means.

4. In combination, a hollow rotating member adapted to contain a fluid under pressure, a stationary casing defining a first chamber in fluid communication with the hollow portion of said rotating member, a seal operatively disposed between said casing and said rotating member, whereby one side of said seal is subjected to said fluid pressure, means defining a second chamber enclosing the other side of said seal, and means for maintaining a fluid pressure in said second chamber of a value intermediate said pressure in said rotating member and the ambient pressure.

5. In combination, a hollow rotating member adapted to contain a fluid under pressure, a stationary casing defining a first chamber in fluid communication with the hollow portion of said rotating member, means for supplying high pressure fluid to said hollow portion of the rotating member through said casing, a seal operatively disposed between said casing and said rotating member whereby one side of said seal is subjected to said high fluid pressure, means defining a second chamber enclosing the other side of said seal, and means for maintaining a fluid pressure in said second chamber of a value intermediate said pressure in said rotating member and the ambient pressure.

6. In combination, a hollow rotating member adapted to contain a fluid under pressure, a stationary casing defining a first chamber in fluid communication with the hollow portion of said rotating member, a seal operatively disposed between said casing and said rotating member, whereby one side of said seal is subject to said high fluid pressure, means defining a second chamber enclosing the other side of said seal, a second seal operatively disposed between said rotating member and said second chamber and having one side thereof exposed to the fluid pressure in said second chamber and the other side exposed to an ambient pressure, and means for maintaining a fluid pressure in said second chamber of a value intermediate said pressure in said first chamber and said ambient pressure.

7. In combination, a hollow rotating shaft, a stationary casing surrounding an end portion of said shaft and partially defining a first chamber in fluid communication with the hollow portion of said shaft, means for supplying high pressure fluid to said first chamber, a first annular sealing means surrounding said shaft and cooperating with said shaft casing to complete the walls of said first chamber, a second annular sealing means surrounding said shaft and cooperating with said first sealing means and said shaft to define a second chamber sealed from the fluid pressure in said first chamber and the ambient pressure, and means for maintaining a fluid pressure in said second chamber of a value intermediate the said high fluid pressure and the ambient pressure.

8. In combination, a hollow rotating shaft, a stationary casing surrounding an end portion of said shaft, an internally projecting flange on said casing surrounding said shaft, a pair of seal assemblies cooperating with portions of said shaft respectively disposed on opposite sides of said flange, a pair of bellows elements sealingly connecting said flange respectively with said seal assemblies, thereby defining a first chamber in fluid communication with the hollow portion of said shaft and a second sealed chamber intermediate said sealing assemblies, means for supplying high pressure fluid to said first chamber, and means for maintaining a fluid pressure in said second chamber of a value intermediate said high pressure and the ambient pressure.

9. In combination, a hollow rotating shaft, a stationary casing surrounding an end portion of said shaft, an internally projecting flange on said casing surrounding said shaft, a pair of external flanges on said shaft defining opposed, generally radial sealing faces, annular seal rings respectively abutting said sealing faces, annular pressure plates respectively abutting said seal rings, resilient means operating between said internal flange and said pressure plates respectively to axially compress said seal rings, and a pair of bellows elements sealingly connecting said flange respectively with said pressure plates, thereby permitting relative expansion and contraction movement of said shaft with respect to said stationary casing.

10. In combination, a hollow rotating shaft, a stationary casing surrounding an end portion of said shaft, an internally projecting flange on said casing surrounding said shaft, a pair of external flanges on said shaft defining opposed, generally radial sealing faces, annular seal rings respectively abutting said sealing faces, annular pressure plates respectively abutting said seal rings, resilient means operating between said internal flange and said pressure plates respectively to axially compress said seal rings, a pair of bellows elements sealingly connecting said flange respectively with said pressure plates, thereby defining a first chamber in fluid communication with the hollow portion of said shaft and a second sealed chamber intermediate said seal rings, means for supplying high pressure fluid to said first chamber, and means for maintaining a pressure in said second chamber of a value intermediate said high pressure and the ambient pressure.

11. In combination, a hollow rotating member adapted to contain a fluid under pressure, a stationary casing defining a first chamber in fluid communication with the hollow portion of said rotating member, means for supplying high pressure fluid to said hollow portion of the rotating member through said casing, a seal operatively disposed between said casing and said rotating member whereby one side of said seal is subjected to said high fluid pressure, means defining a second chamber enclosing the other side of said seal, means for maintaining a fluid pressure in said second chamber of a value intermediate said pressure in said rotating member and the ambient pressure, and means for deriving said intermediate fluid pressure from said high pressure fluid.

12. In combination, a hollow rotating shaft, a stationary casing surrounding an end portion of said shaft, an internally projecting flange on said casing surrounding said shaft, a pair of external flanges on said shaft defining opposed, generally radial sealing faces, annular seal rings respectively abutting said sealing faces, annular pressure plates respectively abutting said seal rings, resilient means operating between said internal flange and said pressure plates respectively to axially compress said seal rings, a pair of bellows elements sealingly connecting said flange respectively with said pressure plates, thereby defining a first chamber in fluid communication with the hollow portion of said shaft and a second sealed chamber intermediate said seal rings, means for supplying high pressure fluid to said first chamber, means for maintaining a pressure in said second chamber of a value intermediate said high pressure and the ambient pressure, and means for deriving said intermediate fluid pressure from said high pressure fluid.

13. A sealing assembly for a rotary shaft-like member adapted to transmit fluid under high pressure, comprising stationary means defining a first chamber in fluid communication with the interior of said shaft-like member, a seal having one side thereof exposed to high pressure disposed between said stationary means and said rotating member, means defining a second chamber enclosing the other side of said seal, and means for maintaining a fluid pressure in said second chamber at a value intermediate said high pressure and the ambient pressure.

14. A sealing assembly for a rotary shaft-like member adapted to transmit fluid under high pressure, comprising means defining a first chamber in fluid communication with the interior of said shaft-like member, a pair of axially spaced seals engageable with said shaft-like member in sealing relationship, a side of one of said seals being exposed to said high pressure and a side of the other of said seals to ambient pressure, means defining a second chamber extending between said seals, and means for maintaining a fluid pressure in said second chamber at a value intermediate said high pressure and the ambient pressure.

LLOYD HORNBOSTEL.

REFERENCES CITED

The following references are of record in the file of this patent:

UNITED STATES PATENTS

| Number | Name | Date |
| --- | --- | --- |
| 1,996,780 | Wheeler | Apr. 9, 1935 |
| 2,381,432 | Bratton | Aug. 7, 1945 |
| 2,384,281 | Carter | Sept. 4, 1945 |
| 2,402,224 | Hornbostel | June 18, 1946 |
| 2,418,620 | Brumagin | Apr. 8, 1947 |